Jan. 12, 1943.   C. G. WALL   2,308,408
FLUID MIXING VALVE
Filed June 27, 1940   2 Sheets-Sheet 1
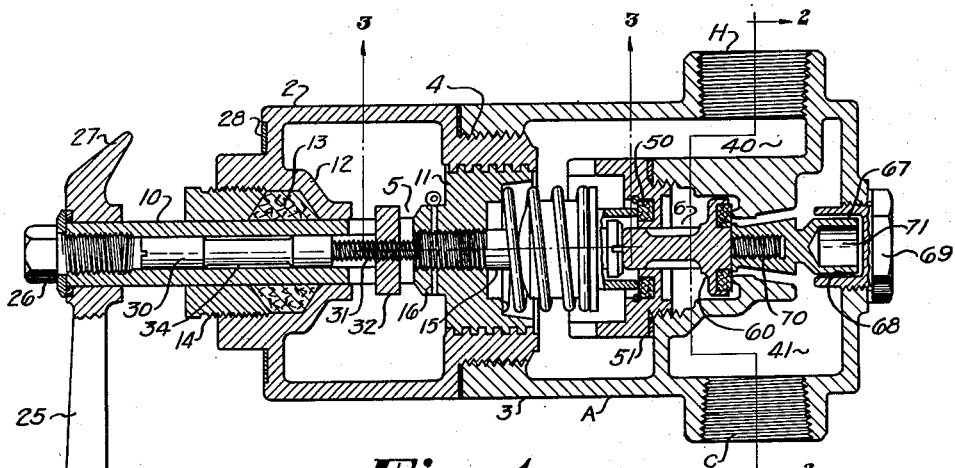
Fig. 1
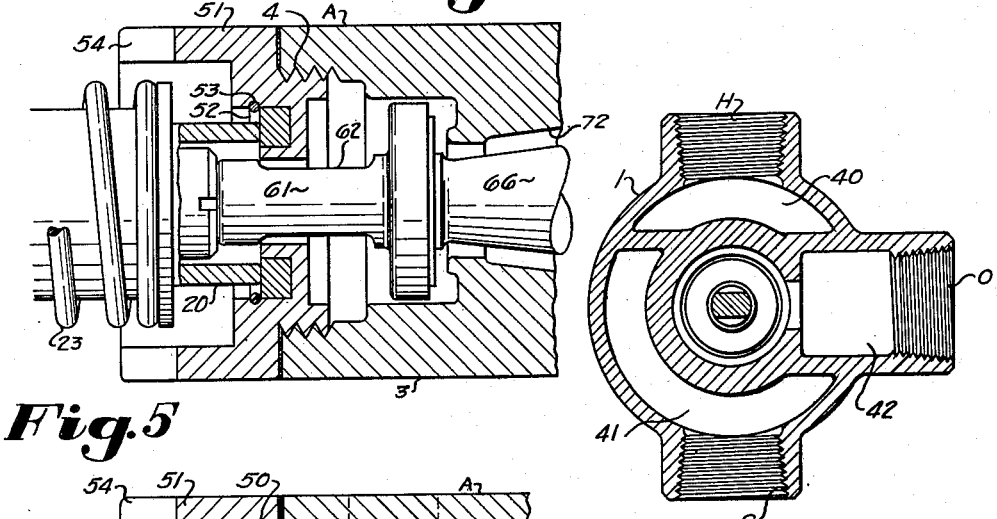
Fig. 5
Fig. 2
Fig. 6
INVENTOR.
CHARLES G. WALL
BY
ATTORNEYS.

Jan. 12, 1943.　　　C. G. WALL　　　2,308,408

FLUID MIXING VALVE

Filed June 27, 1940　　　2 Sheets-Sheet 2

INVENTOR.
CHARLES G. WALL
BY *Fay, Golrick, Williams & Fay*
ATTORNEYS.

Patented Jan. 12, 1943

2,308,408

UNITED STATES PATENT OFFICE 2,308,408

FLUID MIXING VALVE

Charles G. Wall, Philadelphia, Pa.

Application June 27, 1940, Serial No. 342,762

9 Claims. (Cl. 277—18)

This invention relates to a fluid mixing valve which is particularly adapted for use in connection with showers, baths, launderies, lavoratories or in other arrangements where it is desired to mix fluids of different temperatures. My present invention is for an improvement in such valves and may be used for the same purpose as the mixing valve previously described in my patent for an Apparatus for mixing fluids, reissued August 30, 1938, Reissue No. 20,836.

Considerable difficulty has heretofore been experienced with fluid mixing valves, and particularly shower-control valves. This is usually occasioned by a sudden decrease in pressure when other valves in the system are opened or by faulty plumbing or obstructions in the pipe line, each of which may not permit the proper quantity of water to flow at the time when it is needed. As these mixing valves are frequently used with either hot water or steam, serious accidents may result in the event of a sudden failure of the cold water supply. To insure against accidental scalding, therefore, as in the case of a shower valve, the flow of the hot fluid should at all times be under automatic control, in the event of a total failure of the cold water supply. Moreover, when the valve is first opened, or during normal operation when a sudden decrease in pressure occurs in the cold water supply line, due to the opening of other outlets, or from other causes, the quantity of cold water should immediately predominate the mixture.

It is therefore an object of my present invention to provide a fluid mixing valve which is automatically responsive to a total failure of the cold water supply, and in which the quantity of cold water will immediately predominate upon initial opening of the valve or in the event of a sudden decrease in pressure, which may subsequently result.

It is a further object of my invention to provide means for regulating the opening mixture of valve and the range of operating temperatures at which the valve is thereafter responsive.

Figure 7:
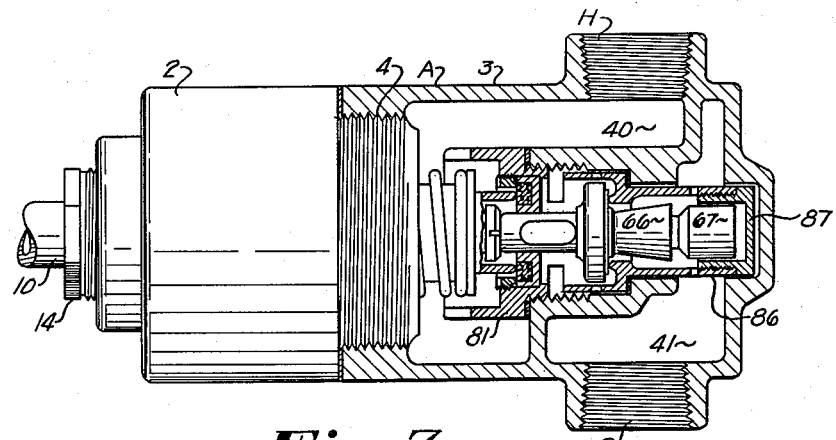
Figure 3:
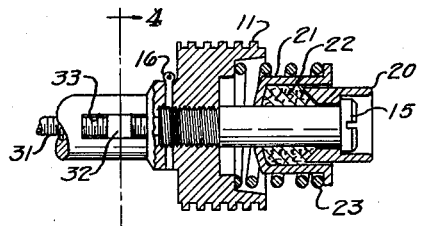
Figure 4:
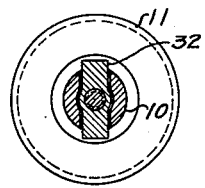
Figure 8:
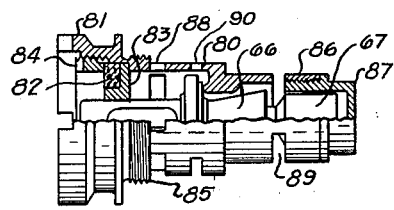

Referring now to the drawings, Fig. 1 is a sectional view taken substantially through the body portion of a mixing valve embodying my invention; Fig. 2 is a sectional view taken substantially along the line 2—2 in Fig. 1; Fig. 3 is an enlarged sectional view of a portion of the stem of the hot water valve taken substantially along the line 3—3 in Fig. 1; Fig. 4 is a transverse sectional view taken along the line 4—4 in Fig. 3; Fig. 5 is an enlarged fragmentary sectional view illustrating the initial opening of the valve; Fig. 6 is a similar view illustrating the valve in open position; Fig. 7 is a sectional view taken substantially through the body portion of a similar valve illustrating the preferred form of my invention, in which the entire valve assembly is embodied in a removable bushing, and Fig. 8 is an enlarged view, partly in section, illustrating the valve assembly bushing, referred to in connection with Fig. 7.

Referring now to Figs. 1 and 2, I have illustrated a fluid mixing valve which is adaptable for use either with hot water or low pressure steam, in which A designates the casing, H the hot water inlet port, C the cold water inlet port, and O the outlet which may be connected to any suitable fixture, for the various purposes hereinbefore described.

The casing for the valve is preferably made in two units, the forward part 2, to carry the stem and plunger assembly 5 and the rearward part 3, to house the mixing valve assembly 6. The respective units are provided with engaging threaded portions, as at 4, to facilitate the assembly or removal of the plunger unit from the remaining part of the casing.

The forward unit 2 of the casing is adapted to receive a hollow stem 10, having disposed thereon a worm cup 11 for threaded engagement with the unit. The forward part of the stem 10 is supported by an internal flanged portion 12, forming a recess in the casing which is provided with suitable packing material 13. A threadedly engaging bushing 14 is disposed in the forward opening of the recess to compress the packing and prevent leakage between the stem and the casing. The plunger assembly 5 is preferably mounted on the worm cup 11 by means of a stem extension screw 15. Provision is also made to secure the extension screw against rotation by means of a pin 16 or other suitable fastening member.

The plunger assembly 5 for the hot water valve preferably comprises a plunger ring 20 mounted for rotation upon the extension 15. The plunger ring 20 is telescopically embraced by a socket member 21 slidably mounted upon the extension and in which provision is made for suitable packing material 22 to provide a fluid seal between the plunger ring and the stem extension 15.

To insure a better seating engagement, the plunger ring 20 is yieldably mounted with reference to its axial movement along the stem extension 15. This is accomplished by the provision of a compression spring 23, or other suitable resilient material, disposed between the socket member 21 and the worm cup 11. The yieldable pressure at which the plunger will react with its seat may be adjusted by removing the pin 16 and turning the stem extension screw 15, either in or out, to increase or decrease the pressure on the plunger ring, after which the pin 16 may be replaced, to lock the extension 15 against further rotation. It may therefore be seen that by this arrangement the plunger 20 is not only mounted for rotation about the axis of the stem to prevent wear and scarring of its seat, but may be yieldably received by its seat to thereby obtain immediate and proper seating of the plunger. Moreover, it will also be apparent that upon opening of the valve, displacement of the plunger will be delayed and thereby obviate an immediate burst of hot water to the outlet or appliance, as soon as the valve has been opened.

The plunger 20 may be either advanced or withdrawn by rotation of the stem 10 acting through the worm cup 11. This is preferably accomplished by the attachment of a suitable handle 25 to the forward end of the stem, which may be secured thereto by means of a cap screw 26. The handle 25 is provided in the usual manner with an indicating pointer 27 associated with a dial 28, or other indicia, on the face of the casing portion 2, to indicate the respective temperatures of the water at different positions of the handle.

The axial movement of the plunger 20 with respect to its seat, and accordingly the resulting temperature of the mixture, may be regulated from the forward end of the hollow stem 10 upon removal of the cap screw 26. This arrangement preferably comprises an adjusting stem 30 slidable within the hollow stem 10, having a threaded extension thereon 31, to engage a stop bar 32. As illustrated in Fig. 1, and more fully in the enlarged sections in Figs. 3 and 4, the stop bar 32 is slidable axially of the stem, in longitudinal slots 33, which act as a guide therefor. It may therefore be seen that by rotating the adjusting stem 30, the stop bar 32 may be positioned in the slot, with respect to its distance from the flange 12 of the forward portion of the casing 2. This adjustment in turn regulates the displacement of the plunger with reference to its seat, and thereby controls the resulting range of temperatures for the hot and cold mixture, which will hereinafter be more fully described.

The foregoing arrangement is particularly advantageous for the reason that an adjustment for temperature may be made from the forward part of the valve, subsequent to its installation. It is not infrequent that an adjustment of the valve is required, without the inconvenience of shutting down both of the supply lines. Such an adjustment may be readily made and to eliminate any seepage through the stem when the valve is adjusted during operation, the recessed portion 34 of the internal adjusting stem 30 may be provided with a suitable packing material, or plastic compound having the proper characteristics for this purpose. It is further apparent that this adjustment of the valve does not require resetting of the handle 25, with respect to the dial 28. The handle 25 will always be correctly positioned regardless of any adjustment that has been made.

The rearward unit 3 of the casing carries the mixing valve assembly 6, which comprises a seat 50 for the hot water plunger 20, and also a floating piston valve 60 for controlling the cold water supply. The interior of this portion of the casing is chambered as at 40 for the passage of the hot water, as at 41 for the cold and as at 42 for communication with the outlet.

The hot water or steam is regulated by displacing the plunger ring 20 with respect to engagement with its seat 50. The seating arrangement may be constructed in several ways, one form of which is illustrated in Fig. 1, in which the seat 50 is recessed within a threaded bushing 51 and held in place therein by a flexible split ring 52 engaging an internal groove 53 in the bushing. The bushing 51 may be provided with slots 54 to facilitate its removal from the casing.

The arrangement for controlling the mixture of the hot and cold fluid comprises a shuttle type floating piston 60 which is loosely mounted for reciprocal movement with respect to the chambers 40, 41 and 42. The piston 60 preferably comprises a stem 61 supported by the bushing 51, the surface of which is ported by a series of grooves 62, to permit communication between the chambers 40 and 42, in certain positions of the stem. The central portion of the piston is flanged outwardly to provide a recessed portion 63 in which to carry a plunger disc 64, adapted to engage the seat 65, to thereby regulate communication between the chambers 41 and 42. The opposite end of the piston is provided with a tapered stem extension 66, terminating in a guide stem 67, which is supported in a recessed portion 68 of a cap screw 69 carried by the casing. To facilitate removal of the plunger disc 64 the stem extension 66 is preferably secured to the piston 60 by a threaded stud 70. The guide 67 may also be recessed, as at 71, to provide a hydraulic cushion to the reciprocal movement of the piston.

As previously pointed out, it is one of the objects of the present invention to provide a mixing valve in which the cold water supply will predominate upon initial opening of the valve and in which the cold water will again immediately predominate in the event of a sudden decrease of the pressure in the cold water supply and thereby obviate scalding or other difficulties where a constant supply of temperate water is expected. In operation, Fig. 5 illustrates the valve upon initial opening as the handle 25 is turned a slight amount. Before the plunger 20 has been displaced from its seat, the turning of the handle 25 withdraws the stem 15, thereby permitting the piston 60 to move forward and open communication between the cold water chamber 41 and the outlet 42. During this initial period the plunger 20 is held in engagement with its seat under the influence of the spring 23 to thereby obivate a sudden burst of hot water to the outlet.

As the plunger 20 is displaced from its seat, the piston 60 is permitted to move forwardly under the influence of the cold water pressure from the chamber 41 until it reaches the point where the grooves 62 are opened for communication with the hot water chamber 40. The throttling action of the grooves 62 causes the hot water to impinge against the flanged portion 63 of the piston 60 to cause the piston to close off the cold water supply. However, as illustrated in Fig. 5, the entrance to the seat 65 is enlarged or tapered, as at 72, to correspond in certain respects to the taper of the extension 66, so that the maximum flow of cold water is provided between the extension 66 and the entrance to the seat 72, which is sufficient to overcome the pressure of the hot water upon initial opening of the valve, and cause the cold water to predominate.

As the plunger ring 20 is further withdrawn, as illustrated in Fig. 6, a point of balance will be reached between the pressure of the hot water impinging upon the flanged portion 63 of the piston and the pressure of the cold water which is permitted to pass between the tapered extension 66 and the entrance opening 72, to the seat 65. The maximum temperature of the mixture may be regulated by adjusting the position of the stop bar 32, as previously described. As a hotter mixture is desired, the increased pressure of the hot water impinging upon the flanged portion 63 of the piston will tend to overcome the pressure of the cold water impinging upon the plunger surface 64, to cause the piston to return to its seat 65. It will be noted, however, as illustrated in Fig. 6 that as the piston 60 is permitted to move forward upon withdrawal of the stem extension screw 15, the displacement between the tapered surface of the piston extension 66 and the entrance to the seat 72 is proportionately diminished so that the cold water supply from the chamber 41 is throttled to the extent that the increased pressure which it thereby creates, by impinging upon the surface of the disc 64 is sufficient to balance the increased pressure created by the hot water pressure impinging upon the opposite side of the disc, and thereby the piston will become stabilized at any desired position of the handle 25. By adjusting the stop bar 32 for either more moderate or increased temperatures, the same action will occur at a point which will permit the piston to stabilize and sustain its position at the desired temperature. It may also be seen that should a sudden decrease of pressure occur in the cold water supply line, the pressure of the hot water impinging upon the flanged portion 63 of the piston will cause the piston to return until a point of balance is again reached, the cold water supply in the meantime increasing in quantity flow as the piston is urged in the direction of the seat 65.

Referring now to Figs. 7 and 8, I have illustrated the preferred form of my invention in which the mixing valve assembly 6 is all embodied in a single valve assembly bushing 80. This arrangement is advantageous in that the entire valve assembly may be removed from the casing, as illustrated in Fig. 8, and moreover it is possible to definitely fix the relative distances between the various seats and openings, to thereby permit greater accuracy of control, than where these respective elements are machined directly in the casing. The bushing 80 preferably comprises a flanged head portion 81, which is recessed to receive the seat 82 to engage the plunger ring 20. The seat 82 is supported upon a retaining disc 83, which is held in position by means of a small threaded collar 84 adapted to engage the interior of the bushing. The central portion of the bushing 80 is provided with a threaded shoulder 85, adapted to be received by a similar threaded portion of the casing 3. An extending portion 86 of the bushing carries a recessed cap 87 adapted to receive the guide 67 of the piston 60. The casing 3 is chambered in a similar manner to the structure described with reference to Fig. 1. The valve assembly bushing 80 is provided with a series of hot and cold water outlet ports 88 and 90 respectively, communicating with the mixing chamber 42. Provision is also made for a series of inlet ports 89, opening into the cold water intake chamber 41. The operation of this form of my valve construction is similar to that described with reference to Fig. 1, with the exception that it is apparent that in my preferred construction the entire valve assembly may be removed as a unit from the casing for replacement of any of the working parts, after the valve has been installed.

When low pressure steam is used, or when hotter temperatures are desired, the piston extension 66 may be replaced by a piston having a larger taper so that a greater throttling effect may be obtained between the tapered portion 66 and the opening to the seat 72. This will accordingly sustain the plunger 60, in an opened position against greater pressures impinging upon the flange 63.

It may therefore be seen that I have invented a new and useful improvement in fluid mixing valves which will be safe and immediately responsive to all variations in pressure which may occur in the supply lines, and which may be regulated to accommodate any desired range of temperatures for the resulting mixture.

I claim:

1. In a fluid mixing device, a casing having an opening and a valve member disposed therein, the valve member comprising a yieldably resiliently mounted plunger and a stem for withdrawing the plunger to open the valve, means for adjusting the yieldable pressure on the plunger a stop for adjusting the displacement of the plunger, and an auxiliary stem carried internally by the first-named stem to regulate the position of the stop, said auxiliary stem being accessible for adjustment, externally of the casing, and said stop being threadedly mounted on said auxiliary stem.

2. In a fluid mixing device, a casing having a forward portion and a rearward portion, the forward portion carrying a stem and a yieldably resiliently mounted plunger and the rearward portion having a seat disposed therein, means for adjusting the yieldable pressure on the plunger a stop carried by the stem for regulating the displacement of the plunger and means accessible internally of the stem to position the stop and thereby regulate the displacement of the plunger, said stop being threadedly mounted on said last-named means.

3. In a fluid mixing device, a casing having a forward portion and a rearward portion, the forward portion carrying a stem and a yieldably resiliently mounted plunger and the rearward portion having a seat disposed therein, means for adjusting the yieldable pressure on the plunger a stop for regulating the displacement of the plunger and means carried by the stem to position the stop and thereby regulate the displacement of the plunger, said stop being threadedly mounted on said last-named means.

4. In a fluid mixing device, a casing having an opening for the entrance of hot fluid, an opening for cold fluid and an outlet, a valve member associated with the hot fluid opening comprising a plunger and a stem for withdrawing the plunger, a second valve member associated with the cold fluid opening comprising a floating piston having a plunger thereon cooperating with a seat carried by the opening, said plunger being positioned between the respective valve members to receive the pressure of the respective fluids on opposite sides thereof, and an extension carried by the piston projecting into the seat, said extension being proportioned with respect to the opening of the seat to increase the pressure of the cold fluid impinging upon the plunger, for a corresponding increase of the pressure exerted by the hot fluid, and thereby maintain the piston in 5. In a fluid mixing device, a casing having an opening for the entrance of hot fluid, an opening for cold fluid and an outlet, a valve member associated with the hot fluid opening comprising a stem and a plunger yieldably mounted to the stem, including means for withdrawing the plunger and means for adjusting the yieldable pressure on the plunger, a second valve associated with the cold fluid opening comprising a floating piston having a plunger thereon cooperating with a seat member carried by the opening in the casing, said plunger being positioned to receive the pressure of the respective fluids impinging upon the opposite sides thereof, and an extension carried by the piston projecting into the seat, said extension being proportioned with respect to the opening of the seat to permit the maximum flow of cold fluid upon initial movement of the plunger and before the yieldable pressure exerted on the hot fluid plunger has been entirely released and thereby cause the cold fluid to predominate upon initial opening of the hot fluid valve member.

6. In a fluid mixing device, a casing having an opening for the entrance of hot fluid, an opening for cold fluid, and an outlet, a valve member associated with the hot fluid opening comprising a plunger and a stem for withdrawing the plunger, a second valve member associated with the cold fluid opening comprising a removable bushing having a seat for the hot fluid plunger and a floating piston therein cooperating with a seat for the cold fluid opening, and an extension carried by the piston projecting into the seat, said extension being proportioned with respect to the opening of the seat to throttle the cold fluid impinging upon the piston upon a corresponding increase of the pressure of the hot fluid, and thereby maintain the piston in a balanced position for any desired temperature of the mixture.

7. In a device for mixing fluids, a casing having provided therein a first valve member controlling the entrance of one fluid and a second valve member for controlling the entrance of a second fluid, said last named valve being under control of the first named valve but structurally independent therefrom, means for discontinuing control of the second fluid valve by said first fluid valve whereby the second fluid valve may act independently of the first fluid valve and means for adjusting the displacement of the first fluid valve with respect to the relative displacement of the second fluid valve to thereby limit the maximum temperature of the mixture.

8. In a device for mixing fluids, a casing having provided therein a first valve member controlling the entrance of one fluid and a second valve member for controlling the entrance of a second fluid, said last named valve being under control of the first named valve but structurally independent therefrom, means for discontinuing control of the second fluid valve by said first fluid valve whereby the second fluid valve may act independently of the first fluid valve and manual means for adjusting the displacement of the first fluid valve with respect to the relative displacement of the second fluid valve to thereby limit the maximum temperature of the mixture.

9. In a device for mixing fluids, a casing having provided therein a first valve member controlling the entrance of one fluid and a second valve member for controlling the entrance of a second fluid, said last named valve being under control of the first named valve but structurally independent therefrom, means for discontinuing control of the second fluid valve by the first fluid valve whereby the second fluid valve may act independently of the first fluid valve, a plunger for the first fluid valve and a stem for the plunger, a stop associated with the stem to regulate the displacement of the plunger and means for adjusting the position of the stop to thereby control the temperature of the mixture.

CHARLES G. WALL.